US010241479B2

(12) United States Patent
Mazarei et al.

(10) Patent No.: US 10,241,479 B2
(45) Date of Patent: Mar. 26, 2019

(54) APPARATUS FOR THE CONTROLLED MIXING AND DISPENSING OF LIQUIDS

(71) Applicant: Liquid Barn, LLC, Simi Valley, CA (US)

(72) Inventors: Ashkan Mazarei, Simi Valley, CA (US); Robert Bishop, Simi Valley, CA (US)

(73) Assignee: Liquid Barn, LLC, Simi Valley, CA (US)

( * ) Notice: Subject to any disclaimer, the term of this patent is extended or adjusted under 35 U.S.C. 154(b) by 659 days.

(21) Appl. No.: 14/846,493

(22) Filed: Sep. 4, 2015

(65) Prior Publication Data

US 2016/0096157 A1    Apr. 7, 2016

Related U.S. Application Data

(60) Provisional application No. 62/045,865, filed on Sep. 4, 2014.

(51) Int. Cl.
*B01F 15/00* (2006.01)
*G05B 15/02* (2006.01)
*G05D 11/13* (2006.01)
*B01F 13/10* (2006.01)

(52) U.S. Cl.
CPC .......... *G05B 15/02* (2013.01); *B01F 13/1066* (2013.01); *G05D 11/132* (2013.01); *B01F 2215/007* (2013.01); *B01F 2215/0022* (2013.01)

(58) Field of Classification Search
CPC .... G05B 15/02; B01F 13/1066; G05D 11/132
USPC ........................................................ 700/265
See application file for complete search history.

(56) References Cited

U.S. PATENT DOCUMENTS

| 5,218,988 A * | 6/1993 | McNamara | .......... G05D 11/132 137/101.21 |
| 2011/0115223 A1 * | 5/2011 | Stahlkopf | ............... F01K 13/02 290/7 |

* cited by examiner

*Primary Examiner* — Bo Fan
(74) *Attorney, Agent, or Firm* — Sheridan Ross P.C.

(57) ABSTRACT

A new apparatus & method of use thereof for providing a selectable e-liquid juice solution from a dispenser are provided. In one embodiment a method for (a) providing a user determined combination of various liquids in a predetermined mixture that results in customized e-liquid juice having user specified quantities of propylene glycol, vegetable glycerin, nicotine, and flavoring is disclosed; (b) separately storing at least four liquids to be mixed after user determined selections are input; (c) facilitating the storage in memory of recipes for e-liquid juice or combinations thereof; (d) receiving a selection or user input for a specific combination of liquids; (e) dispensing automatically in response to the selection or user input the resulting volume of liquid combination.

20 Claims, 4 Drawing Sheets

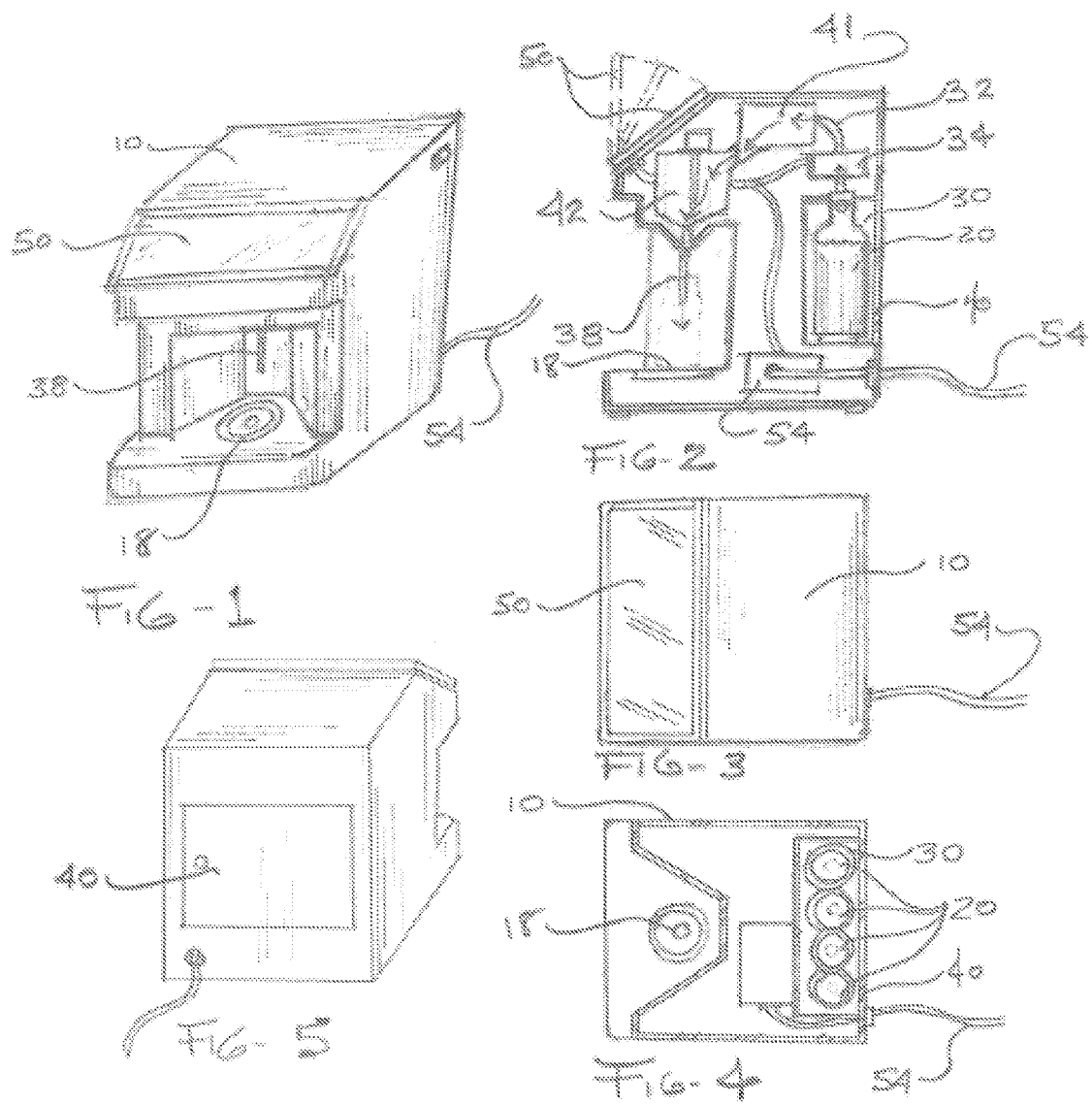

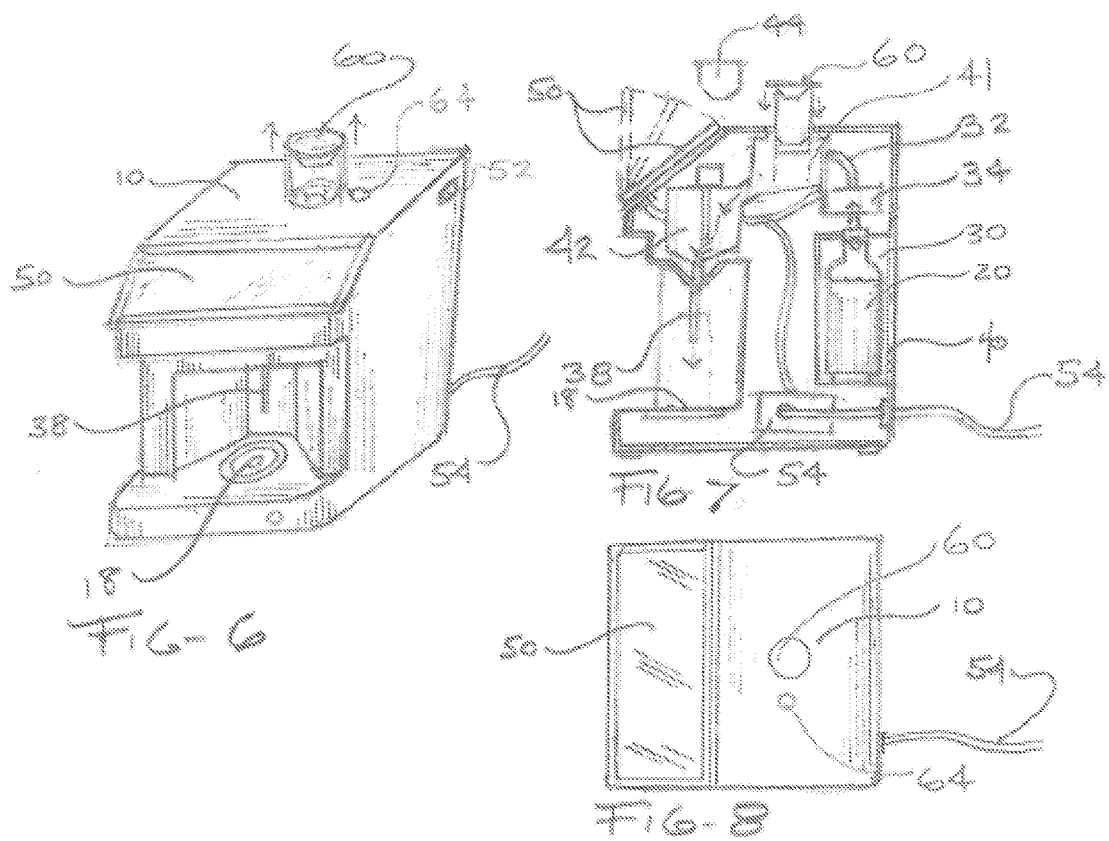

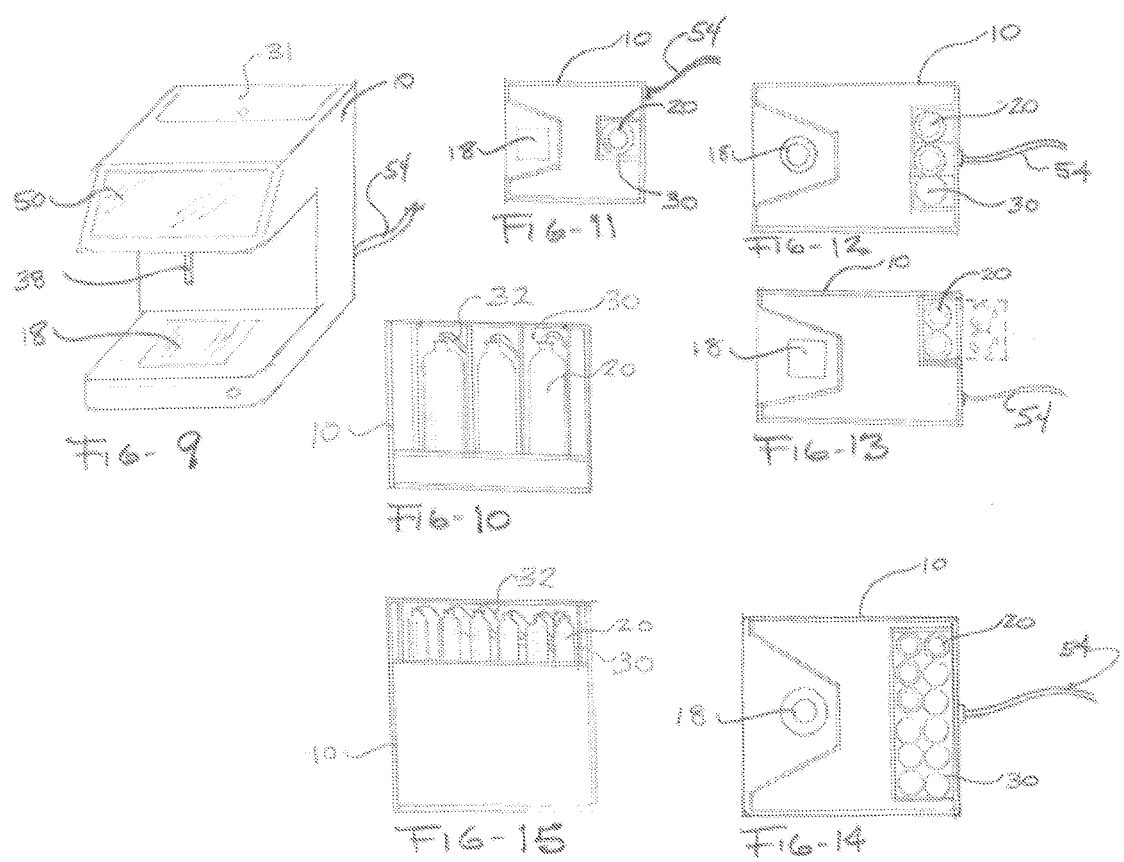

APPARATUS FOR THE CONTROLLED MIXING AND DISPENSING OF LIQUIDS

CROSS REFERENCE TO RELATED APPLICATION

This application claims priority to U.S. provisional application No. 62/045,865 filed Sep. 4, 2014, the entirety of which is included herein for reference.

FIELD OF THE INVENTION

This invention relates generally to the field of liquid dispensing apparatus and devices. Moreover it pertains specifically to an apparatus that will efficiently and accurately mix and dispense liquids such as those used in the production of e-cigarette liquids.

BACKGROUND

A variety of liquid dispensing apparatus are used throughout the world to dispense a wide variety of liquids including water, coffee, tea, soda, medicines, and numerous other liquids. Some of these apparatus dispense liquids directly from liquid storage containers directly to the end user with no mixing or alteration to the liquid, it is dispensed as it exists within the container offering the user no interaction with the liquid during the dispensing process. The user has no ability to modify the liquid between the process of selecting the liquid and the act of the liquid being dispensed.

Many apparatus combine more than one liquid from more than one liquid storage container during the process of dispensing the final liquid mixture to the end user, such as a soda dispensing machine that combines carbonated water with a flavorant or syrup. As with previous apparatus, these apparatus do not allow an end user to interact with or otherwise manipulate the proportions of the various liquids being dispensed.

Other apparatus that do not allow for a user to manipulate the proportions of the various liquids being dispensed, such as a store employee, machine owner, or machine service vendor having the ability to adjust the proportions of the carbonated water and the flavorant or syrup, still do not allow the end user to have that ability in a manner that is unique to that end user.

Many coffee dispensing apparatus that allow a user to manually initiate the dispensing of additional liquids, such as creamer or flavoring, to their coffee, do so in a non-precise manner that does not allow for the input, selection, combining, or dispensing of exact proportions or ratios of various liquids.

Many apparatus allow a user to insert a pre-packaged container of dried coffee, and then initiate a process of dispensing through the method of percolating, filtering, or forcing variable amounts of hot water into and through the container of dried coffee and into a cup or mug. These apparatus do not allow the combining of variable amounts of multiple liquids into a single dispensed liquid.

SUMMARY

The terms "invention", "this invention", and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of the various aspects of the invention and introduces some of the concepts that are further described as the Detailed Description section below. This summary is not intended to identify key or essential features of the claimed subject matter, nor is ti intended to be used in isolation to determine the scope of the claimed subject matter. The subject matter should be understood by reference to appropriate portions of the entire specification of this patent, any or all drawings and each claim.

In view of the limitations now present in the prior art, the present invention provides a new and useful apparatus for mixing and dispensing liquids, such as propylene glycol, vegetable glycerin, nicotine, and flavoring in a controlled and automated manner, which is simpler in construction, more universally functional and more versatile in operation than known apparatus of this kind.

DETAILED DESCRIPTION

This invention provides an apparatus for combining, mixing, and dispensing various liquids, such as e-juice, in a predetermined mixture that results in customized e-liquid juice having user defined quantities of liquids, including but not limited to, propylene glycol, vegetable glycerin, nicotine, flavoring, alcohol, as well as other liquids not referred to herein that are to be considered apparent and obvious to the disclosure. It is also a purpose of the present invention to provide a new apparatus for the controlled mixing and dispensing of liquids that has many novel features not offered by the prior art apparatus that results in a new liquid mixing and dispensing apparatus which is not apparent, obvious, or suggested, either directly or indirectly by any of the prior art apparatus. This invention can be used in the proposed preferred embodiment for combining, mixing, and dispensing a wide variety of known liquids as well as a variety of alternate embodiments that combining, mix, or dispense additional liquids that may be developed in the future.

The present invention generally comprises a main machine housing 10, a plurality of liquid containment reservoirs 30 or chambers, a plurality of unmixed liquids 20, a plurality of individual unmixed liquid containers 22, a plurality of liquid transfer tubes 32, a plurality of electronic liquid control valves or pumps 34, a combined liquid dispensing supply tube 38, a liquid combining 41 or mixing reservoir 42, a pre-packaged liquid container reservoir 44 available in alternate embodiments of the invention, an activation button 64 to open the pre-packaged liquid container reservoir, pre-packaged liquid containers 46 available in alternate embodiments of the invention, a fixed or adjustable electronic digital display and user interface panel 50 with related electronics and software, a liquid mixing calculation and dispensing management program or software, wireless (wifi) internet connection and capabilities. Universal Serial Bus (USB) connection 52, optional liquid collection plate 18, and a power supply 54.

The main housing 10, in the preferred embodiment, is intended to be a counter top dispensing system capable of housing multiple liquids 20, including but not limited to, those related to the production of e-liquid juice. It is anticipated that the unmixed liquids 20 may be housed securely in position by placing individual containers 22 of each liquid 20 into individualized liquid containment reservoirs 30 disposed side by side within the housing 10, with each reservoir 30 having a lid or cover, or optionally a single larger lid 31 or rear access cover 40 that will thereby act to enclose and secure each liquid in a manner that will prevent unwanted comingling of liquids.

It is also anticipated that each liquid 20 may be pre-contained within a liquid container 22 such as a bottle, ecig tank, cartonizer, disposable vas, vial, jar, or similar vessel, which can be placed within the housing 10 or in close proximity thereto and thereby connect to one of the plurality of liquid dispensing tubes.

In yet another embodiment of the invention it is anticipated that specifically designed and sized replaceable or refillable containers can be manufactured to interconnect with both the housing and the liquid pumping and dispensing tubes resulting, in one embodiment, in an array of liquid containers disposed side by side within specific recesses, chambers, or regions of the housing and thereby providing a secure method for storing and dispensing each liquid while also allowing for ease of container replacement or refill.

The electronic user interface module 50, in the preferred embodiment, is integrated within the main housing 10 body, having a touch screen display and electronic processors, software and components necessary to facilitate the controlled user initiated selection of and dispensing of liquids into the desired combination, proportions, percentages or ratios, whereby the electronic user interface module receives and communicates each user selection to the corresponding electronic liquid control valve or pump to dispense the correct amount of individual liquid to be transferred to the liquid combining chamber, to be further transferred or otherwise allowed to flow as directed by gravity fed channels to the mixing and dispensing reservoir.

It is to be understood that the method of dispensing each liquid, based on the specific user selection via the electronic user interface module, can be facilitated by dispensing each liquid individually directly into an end use container, or can dispense each liquid into a liquid combining reservoir, from which the final combined liquid is dispensed into the end user container.

The electronic user interface (EUI) module is intended to embody computing software code, processors, memory, and related hardware components to allow for a variety of user initiated interactivity including the input and management of preset liquid combinations or "recipes" that can be pre-programmed into the device, downloaded to the device, or manually entered into the device. The electronic user interface module is further intended to allow a user to "save" a specific combination of liquids and then recall that saved selection as an option for future selection. The number of "preset" or "saved" combinations that can be saved is limited only by the storage capacity of the computing memory of the electronic user interface module. It is intended that the EUI module comprise computer related hardware and software allowing for use and functionality including but not limited in use to, touch activated, software menus and functionality, voice recognition, voice command activation, remote access and control, USB interface, wireless communication capabilities (wi-fi), download and execution of computer based applications or APPS.

The preferred embodiment of the present invention includes computer applications or APPS and related computer hardware and software that allow users to perform a variety of computer or network based functions including allowing users of multiple liquid mixing and dispensing machines, each in a location removed from the others, to connect to each other over a shared, secured, or common electronic network, and thereby facilitate the sharing, downloading, uploading, ordering of liquids, purchasing of liquids, or saving of information such as "recipes", "user comments", "photos", or other digital information or data not referred to herein which is to be considered apparent and obvious to the disclosure.

The dispensing of each liquid used in the preferred embodiment of the present invention is initiated by a user input or selection, or pre-set determination, via the electronic user interface module (EUI), which then communicates the dosage information to a corresponding electronic liquid control valve or pump which thereby regulates the correct amount of liquid dispensed. The method for facilitating the dispensing of the liquid can be accomplished by means of an electronically controlled pump device that can be integrated with the electronic liquid control valve, or optionally as a separate device that is in electronic communication with the electronic liquid control valve.

An alternate embodiment of the invention comprises a single electronic pump that is electronically connected to, and thereby controls, each individual electronic liquid control valve.

Yet another alternate embodiment of the invention comprises a single servo-synchronized peristatic transfer pump interconnected to one or more liquid dispensing tubes, wherein the transfer pump receives instructions via the electronic user interface module.

In still another alternate embodiment of the present invention it is to be understood that the liquids as described herein are anticipated to be supplied as dry goods, with said dry goods having the form of freeze dried products obtained from aqueous solutions of liquids referred to herein for the production of e-liquid juice. The freeze dried products are anticipated to be manufactured as individual products and combined into "recipes" containing specific amounts of each product for each "recipe", the specific "recipe" combinations are intended to be contained with a "k"-cup type of container such as that used in coffee dispensing machines. Recipes or flavors can be premixed as freeze dried products and offered for sale to consumers for use with a specific e-liquid juice rehydration dispensing machine that will act to rehydrated the freeze dried products with water resulting in an amount of e-liquid juice having the desired levels of nicotine and flavoring.

It is to be understood that the present invention can be embodied to deliver a single dose of specified volume of dispensed e-liquid into an end use container, or can be embodied to simultaneously dispense multiple doses of specified volume into multiple corresponding end use containers. Further, the invention is anticipated to dispense varied or alternating recipes or combinations of liquids in multiple doses of specified volume into multiple corresponding end use containers, whereby the output of dosage volume and recipe selection is facilitated via the EUI module.

The present invention in an alternate embodiment will, in response to receipt by a computer processor of the selection of a propylene glycol percentage, vegetable glycerin percentage, liquid nicotine percentage, and the selected beverage flavoring and or percentage thereof, will dispense continuously in a predetermined ratio for any volume of the beverage as determined by either a manual or mechanical operation. This embodiment will be especially useful when filling large containers with large volumes of specific e-liquid juice.

The liquids intended for use with the present invention include but are not limited in use to, propylene glycol, vegetable glycerin, nicotine, polyethylene glycol 400 (PEG400), alcohol, fruit, nicotine free flavorings, flavorants including but not limited to concentrated or extracted flavorings, food acids, flavor oils, flavor chemicals, or any other suitable flavoring and combinations thereof.

It is anticipated that the present invention further comprise a website that is intended to facilitate a variety of services for a user including but not limited to, the general information or education of the related industry including e-liquid juice, e-cigarettes, nicotine addiction and support services thereof, government regulations or guidelines at Federal, State, and Local levels, e-juice ingredients, recipes, e-liquid calculators, e-juice forums to share information, as well as an ecommerce section of the website to facilitate the purchase and or sale of e-liquid juice related manufacturing liquids, literature, safety guidelines, as well as end use accessories, products, or commercial goods.

The website can further serve as a support system for commercial sales and service of the e-juice machines and specific liquids, containers, "k"-cups, and supplies.

Additionally the present invention anticipates the need for Computer Applications or APPS specific to e-liquid recipes, such as an "eJuice" APP.

Further, the present invention anticipates the need for Computer Applications or APPS specific to e-liquid calculators, including:
1. e-liquid combining calculator APP that will allow a user to customize, share, create, or send to the dispensing machine via wifi to be dispensed from the machine and saved into the memory of the machine for future recall and use.
2. "Nicotine Quitting" APP that reduces the nicotine levels over time automatically adjusting the levels of nicotine dispensed based on the "quit program" the user has chosen. Aggressive programs will reduce the daily amount of nicotine dispensed faster than more passive programs which will reduce the levels of nicotine dispensed over a more gradual period of time. It is to be understood that the app will perform and operate in a manner similar to other computer based applications or "Apps" for computers, smart phones, iPads, iPhones, etc. The user would also have the ability to customize their quit program via the apps user interface.
3. ejuice Flavor Calculator APP Additional Alternate Embodiments Version 1:
1 input. A user would purchase prepackaged eliquid and the machine just dispenses it. The eLiquid is flavored and may or may or may not contain nicotine.

Version 2:
2 inputs. A user would purchase eLiquid and eLiquid with nicotine. This gives the user nicotine strength control. The user has control over the nicotine strength by the ratio between the non nicotine eLiquid and the eLiquid with nicotine. The first liquid is used to dilute the liquid with nicotine. It can dispense any vapable strength of eLiquid.

Version 3:
3 inputs. Unflavored eLiquid, Unflavored eLiquid with nicotine, and flavoring liquid. This allows for the same nicotine control as version 2, but now a user can flavor it as desired.

Version 4:
4+ inputs. The eLiquid is broken down to its individual components. There are inputs for PG, VG, Nic, and flavoring. Total control over the eLiquid.

It is to be understood that eLiquid 44 may be pre-combined in a wide variety of combinations, proportion, recipes or ratios in separate storage containers and then inserted into the machine to be dispensed.

GENERAL OVERVIEW & METHOD OF USE

General Overview and Method of Use:
Preferred embodiment liquids reference:
Propylene Glycol (PG)
Vegetable Glycerin (VG)
Nicotine (PG or VG based)
flavoring (PG or VG based)
Step 1: User inputs PG/VG ratio—EXAMPLE (75%/25%)
Step 2: User inputs Nicotine Strength Percentage—EXAMPLE (10%)
Step 3: User inputs Flavor Strength Percentage—EXAMPLE (5%)
Step 4: User pushes a "Dispense" button
The computer processor then uses a specific formula to accurately mix the liquid ingredients to create the desired strength of e-liquid juice.

The machine contains the liquid ingredients:
Propylene Glycol (PG), Vegetable Glycerin (VG), Nicotine (PG or VG based), Flavoring (PG or VG based).

The liquids are attached to a pump that dispense a specific amount of each liquid as determined by the computer.

The computer determines the percentage of each liquid to be dispensed, based on the user input during steps 1, 2, and 3. The formulas are embodied as computer coding language.

The liquids are then dispensed to either a mixing chamber and then to a final container such as an ecig tank or bottle, or can be dispensed straight to the final end use container such as an ecig tank or bottle as mixing is not mandatory.

A user can also control the machine using a computer based application or APP to mix flavors and strengths over a mobile device APP, additionally a user can store or send the information to the machine to dispense.

A user can also vary the levels of any liquid over a specific time period. For example a user can input that they want to reduce the level of nicotine used from 20% to 0% over the period of a year and the computer processor will automatically adjust the nicotine levels throughout that time period. This will aid users in the process of quitting a nicotine addiction.

It is to be understood that the present invention may be embodied with one or a multitude of a variety of different liquids while still performing the intended use and function and is therefore to be considered apparent and obvious to the disclosure contained herein.

The present invention may be manufactured in a variety of sizes from a portable counter top embodiment to a free standing stationary embodiment, as well as other sizes and applications not referred to herein, with each embodiment and application performing the intended use and function disclosed herein and is therefore to be considered apparent and obvious to the disclosure contained herein.

The foregoing has outlined, in general, the physical aspects and intended use and function of the invention and is to serve as an aid to better understanding the application of the invention. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The following drawings further describe by illustration the advantages and objectives of the present invention.

FIG. 1. is an isometric view illustration showing one embodiment of the liquid dispensing machine.

FIG. 2. is a section view illustration showing (1) liquid container, connecting tubes, an alternate embodiment of the pumps and valves, liquid transfer tubes, liquid combination chamber, liquid mixing and dispensing reservoir, liquid dispensing tube and adjustable user interface display panel.

FIG. 3. is a plan view illustration showing one embodiment of the invention with the user interface display panel in the start or default position.

FIG. 4. is a diagram plan section view illustration showing main body housing, (4) liquid containers, power supply and liquid dispensing tube.

FIG. 5. is an isometric view illustration showing the back of the main body housing, and the removable access panel.

FIG. 6. is an isometric view illustration showing another embodiment of the liquid dispensing machine having a pre-packaged liquid container reservoir.

FIG. 7. is a section view illustration showing (1) liquid container, a pre-packaged liquid container reservoir as well as a pre-packaged liquid container, connecting tubes, an alternate embodiment of the pumps and valves, liquid transfer tubes, liquid combination chamber, liquid mixing and dispensing reservoir, liquid dispensing tube and adjustable user interface display panel.

FIG. 8. is a plan view illustration showing another embodiment of the invention with the pre-packaged liquid container reservoir in the closed position as well as an activation button 64 to open the pre-packaged liquid container reservoir.

FIG. 9. is an isometric view illustration showing yet another embodiment of the liquid dispensing machine having a removable access panel located at the top of the main housing body.

FIG. 10. is section view illustration showing (3) liquid containers and liquid transfer tubes within the main housing body.

FIG. 11. is a plan section view illustration showing (1) liquid container.

FIG. 12. is a plan section view illustration showing (3) liquid container.

FIG. 13. is a plan section view illustration showing (2) liquid container.

FIG. 14. is a plan section view illustration showing (12) liquid container.

FIG. 15. is a section view illustration showing (6) liquid containers and liquid transfer tubes within the main housing body.

Figure 16:
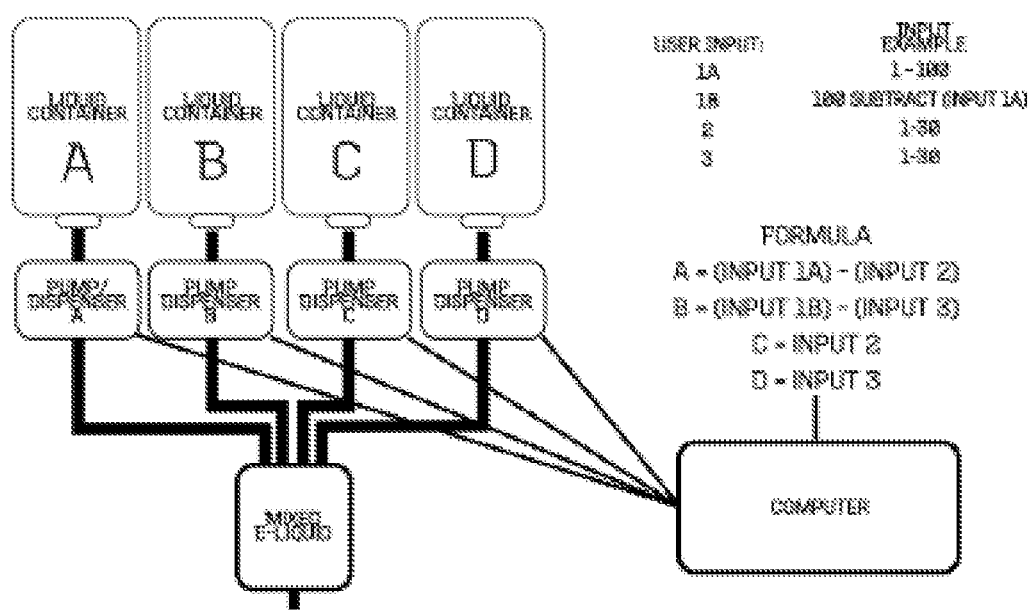
FIG. 16. is a diagram plan view illustration showing (4) liquid containers and connecting tubes, (4) corresponding pump containers and connecting tubes feeding to a mixed liquid container for dispensing the mixed liquid, further showing one embodiment of a computer formula input and a user input example.

What is claimed is:

1. A system for dispensing a mixed liquid, comprising:
a housing defining an enclosed volume;
a plurality of reservoirs, and wherein a first reservoir of said plurality of reservoirs contains a first liquid;
a first pump interconnected to said first reservoir;
a mixing chamber positioned in said enclosed volume of said housing, and said mixing chamber is interconnected to an output of said first pump;
a display panel operatively interconnected to said first pump, and said display panel is configured to receive a first input and a second input, wherein said first input activates said first pump to transport a predetermined amount of said first liquid contained in said first reservoir to said mixing chamber, and wherein a mixed liquid in said mixing chamber comprises said first liquid and a second liquid; and
a memory unit operatively interconnected to said display panel, and said memory unity is configured to store a recipe for said mixed liquid; and
a first communication unit operatively interconnected to said display panel, and said first communication unit is configured to transmit an electromagnetic signal, wherein said second input causes said first communication unit to transmit, via said electromagnetic signal, said recipe from said memory unit.

2. The system of claim 1, wherein said first input corresponds to a characteristic of said mixed liquid, and said first input activates a second pump to transport a predetermined amount of said second liquid contained in a second reservoir of said plurality of reservoirs to said mixing chamber, and said mixing chamber combines said first liquid and said second liquid into said mixed liquid that has said characteristic.

3. The system of claim 2, wherein said characteristic is nicotine strength, said first liquid is one of propylene glycol and vegetable glycerin, and said second liquid is nicotine.

4. The system of claim 2, wherein said characteristic is a flavoring content, and said second liquid is a flavoring liquid.

5. The apparatus of claim 1, wherein said electromagnetic signal is transmitted to a second communication unit via a social media network.

6. The apparatus of claim 1, wherein a third input provided to said display panel assigns a rating to said recipe, and said rating is transmitted, via said electromagnetic signal, with said recipe.

7. The apparatus of claim 1, wherein said first communication unit of said dispensing device is configured to receive said first input from a remote user via a social media network.

8. The apparatus of claim 1, wherein said recipe comprises at least one of a propylene glycol, a vegetable glycerin, a nicotine, a polyethylene glycol 400 (PEG400), an alcohol, a fruit, a nicotine free flavoring, a concentrated flavoring, an extracted flavoring, a food acid, a flavor oil, and a flavor chemical.

9. A method for changing a characteristic of a mixed liquid, comprising:
providing a system for dispensing a mixed liquid, the system comprising:
a first reservoir containing a first liquid and a second reservoir containing a second liquid;
a first pump interconnected to said first reservoir and a second pump interconnected to said second reservoir;
a mixing chamber interconnected to an output of said first pump and an output of said second pump;
a display panel operatively interconnected to said first pump and said second pump;
selecting, in a first instance, an input of said display panel to activate said first pump to transport a predetermined amount of said first liquid to said mixing chamber, and to activate said second pump to transport a predetermined amount of said second liquid to said mixing chamber;

combining, in said first instance, said first liquid and said second liquid in said mixing chamber to form a first mixed liquid having a characteristic;

selecting, in a second instance, said input of said display panel to activate said first pump to transport a predetermined amount of said first liquid to said mixing chamber, and to activate said second pump to transport a predetermined amount of said second liquid to said mixing chamber; and combining, in said second instance, said first liquid and said second liquid in said mixing chamber to form a second mixed liquid having said characteristic, wherein said characteristic of said first mixed liquid is distinct from said characteristic of said second mixed liquid.

10. The method of claim 9, further comprising:
decreasing said characteristic of said mixed liquids between said first instance and said second instance, wherein said characteristics of said mixed liquids is nicotine strength.

11. The method of claim 10, wherein said nicotine strength of said first mixed liquid is 20% and said nicotine strength of said second mixed liquid is less than 20%.

12. The method of claim 9, further comprising:
elapsing a predetermined time period between said first instance and said second instance, wherein the difference of said characteristic of said first mixed liquid and said characteristic of said second mixed liquid depends on said predetermined time period.

13. The method of claim 9, further comprising:
elapsing a predetermined time period between said first instance and said second instance, wherein the difference of said characteristic of said first mixed liquid and said characteristic of said second mixed liquid does not depend on said predetermined time period.

14. The method of claim 9, wherein said first liquid is one of a propylene glycol, a vegetable glycerin, a nicotine, a polyethylene glycol 400 (PEG400), an alcohol, a fruit, a nicotine free flavoring, a concentrated flavoring, an extracted flavoring, a food acid, a flavor oil, and a flavor chemical.

15. A method for reducing the nicotine content of a mixed liquid over a predetermined time period, comprising:
providing a system for dispensing a mixed liquid, said system having a mixing chamber connected to a first reservoir and a second reservoir, said mixing chamber configured to store a mixed liquid that comprises a first liquid from said first reservoir and a second liquid from said second reservoir;

connecting an interface module to said system, wherein said interface module is configured to control the dispensing of the first liquid and the second liquid into the mixing chamber;

transmitting a first recipe to said interface module, said first recipe defining a first liquid portion, a second liquid portion, and a nicotine content of said mixed liquid;

dispensing, by said interface module in a first instance, said first liquid portion and said second liquid portion into said mixing chamber to form said mixed liquid according to said first recipe, wherein said mixed liquid has a nicotine content greater than or equal to 20%;

elapsing a predetermined time period between said first instance and a second instance; and dispensing, by said interface module in said second instance, said first liquid portion and said second liquid portion into said mixing chamber to form said mixed liquid according to a second recipe, wherein said mixed liquid has a nicotine content less than 20%.

16. The method of claim 15, wherein said interface module automatically dispenses said first liquid portion and said second liquid after said predetermined time period.

17. The method of claim 15, wherein a remote user transmits said first and second recipes to said interface module via a social media network.

18. The method of claim 15, further comprising:
storing a set of recipes on a social media network, said set of recipes comprising said first recipe and said second recipe; and
reducing, progressively through instances, the nicotine content of the recipes until the nicotine content is zero.

19. The method of claim 15, wherein a remote user manually determines the predetermined time period between said first instance and said second instance, and said remote user manually inputs said second nicotine content according to said second recipe into said interface module.

20. The method of claim 15, further comprising:
transmitting a set of recipes via a social media network from said interface module to a second interface module of a second system for dispensing a mixed liquid.

\* \* \* \* \*